US008444225B2

(12) United States Patent
Behe

(10) Patent No.: US 8,444,225 B2
(45) Date of Patent: May 21, 2013

(54) DEPLOYABLE LEGREST

(75) Inventor: Andrew Behe, Kernersville, NC (US)

(73) Assignee: BE Aerospace, Inc., Wellington, FL (US)

( * ) Notice: Subject to any disclaimer, the term of this patent is extended or adjusted under 35 U.S.C. 154(b) by 161 days.

(21) Appl. No.: 13/018,686

(22) Filed: Feb. 1, 2011

(65) Prior Publication Data
US 2011/0240797 A1 Oct. 6, 2011

Related U.S. Application Data

(60) Provisional application No. 61/300,519, filed on Feb. 2, 2010.

(51) Int. Cl.
A47C 7/50 (2006.01)
A47C 20/00 (2006.01)
A47C 20/08 (2006.01)
B60N 2/00 (2006.01)
B60N 2/02 (2006.01)

(52) U.S. Cl.
USPC .................... 297/423.26; 297/423.3; 297/330

(58) Field of Classification Search
USPC ................... 297/68–91, 330, 423.26, 423.27, 297/423.28, 423.3
See application file for complete search history.

(56) References Cited

U.S. PATENT DOCUMENTS

| 5,352,020 | A | * | 10/1994 | Wade et al. | 297/423.26 |
|---|---|---|---|---|---|
| 5,560,681 | A | * | 10/1996 | Dixon et al. | 297/423.26 X |
| 6,227,489 | B1 | * | 5/2001 | Kitamoto et al. | 297/68 X |
| 6,267,445 | B1 | * | 7/2001 | Marais | 297/423.26 X |
| 6,494,536 | B2 | * | 12/2002 | Plant | 297/423.36 X |
| 6,517,160 | B2 | * | 2/2003 | Marcantoni | 297/423.28 X |
| 6,526,643 | B1 | * | 3/2003 | Renault | 297/423.26 X |
| 6,652,033 | B2 | * | 11/2003 | Satoh | 297/423.3 |
| 6,659,562 | B2 | * | 12/2003 | Uchiyama | 297/423.3 |
| 6,663,184 | B2 | * | 12/2003 | Hagiike | 297/423.3 |
| 6,688,691 | B2 | * | 2/2004 | Marechal et al. | 297/84 X |
| 6,692,069 | B2 | * | 2/2004 | Beroth et al. | 297/411.3 X |
| 6,695,406 | B2 | * | 2/2004 | Plant | 297/423.26 |
| 6,698,836 | B1 | * | 3/2004 | Veneruso | 297/423.26 X |
| 6,731,088 | B2 | * | 5/2004 | Nivet | 297/330 X |
| 6,752,463 | B2 | * | 6/2004 | Nivet | 297/423.3 |
| 6,764,137 | B2 | * | 7/2004 | Menard | 297/423.26 X |
| 6,773,074 | B2 | * | 8/2004 | Flory et al. | 297/423.26 X |
| 6,783,178 | B2 | * | 8/2004 | Kasahara | 297/330 |
| 6,874,855 | B2 | * | 4/2005 | Nivet | 297/423.3 |
| 6,902,238 | B1 | * | 6/2005 | Abt et al. | 297/423.26 X |
| 6,916,069 | B2 | * | 7/2005 | Bauer et al. | 297/423.3 |
| 6,929,320 | B2 | * | 8/2005 | Laurent | 297/83 |
| 6,929,323 | B2 | * | 8/2005 | Enno | 297/423.26 X |
| 7,121,627 | B2 | * | 10/2006 | Gaikwad et al. | 297/423.36 |
| 7,201,451 | B2 | * | 4/2007 | Baumann | 297/70 X |
| 7,607,732 | B2 | * | 10/2009 | Beroth et al. | 297/68 X |
| 7,712,831 | B2 | * | 5/2010 | Abt et al. | 297/68 X |
| 8,201,876 | B2 | * | 6/2012 | Dowty et al. | 297/85 M |

(Continued)

Primary Examiner — Rodney B White
(74) Attorney, Agent, or Firm — Shumaker, Loop & Kendrick, LLP

(57) ABSTRACT

A legrest assembly including a calf support hinged to a forward end of a seat frame and moveable between a stowed configuration generally vertically disposed below the forward end of the frame and a deployed configuration inclined above the stowed configuration, a foot support movable with and telescopically connected to the calf support, and a foot rest pivotally connected to the foot support and pivotable between a stowed configuration substantially parallel to the foot support and a deployed configuration extending outward from the foot support.

11 Claims, 5 Drawing Sheets

U.S. PATENT DOCUMENTS

| | | | |
|---|---|---|---|
| 2002/0113477 A1* | 8/2002 | Uchiyama | 297/330 |
| 2004/0100137 A1* | 5/2004 | Johnson | 297/423.26 |
| 2005/0173963 A1* | 8/2005 | Edrich et al. | 297/423.28 |
| 2008/0197677 A1* | 8/2008 | Nivet | 297/68 |
| 2011/0025113 A1* | 2/2011 | Thoreux | 297/330 |
| 2012/0228919 A1* | 9/2012 | Dowty et al. | 297/85 M |

* cited by examiner

DEPLOYABLE LEGREST

CROSS-REFERENCE TO RELATED APPLICATION

This application claims priority to U.S. Provisional Application No. 61/300,519 filed Feb. 2, 2010 and entitled "DEPLOYABLE LEGREST", the contents of which are incorporated by reference herein.

TECHNICAL FIELD AND BACKGROUND OF THE INVENTION

This invention relates generally to a legrest assembly for a passenger seat, and more particularly, to a deployable legrest assembly including tensioned fabric diaphragm surfaces that are deployed and stowed under forces applied by a seated passenger.

Airline passengers in all sections of an aircraft desire comfort whether they are seated in first-class, coach, or budget-seating areas. Aircraft designers and commercial operators are therefore challenged to provide as many comfortable amenities as space and financial constraints will permit, and these constraints are particularly critical in the more densely seated sections of an aircraft.

Improvements are needed in legrests for aircraft passenger seats. Legrests that support all portions of a passenger's legs and feet are needed while space restraints must be observed particularly with regard to providing a legrest that can be stowed into a compact configuration.

BRIEF SUMMARY OF THE INVENTION

In one embodiment, a deployable legrest assembly for a passenger seat having a frame with a forward end is provided herein. The legrest assembly generally includes a calf support platform, a foot support platform, and a foot rest. The calf support platform is pivotally connected to the forward end of the frame. The calf support platform has a stowed configuration in which the calf support platform is generally vertically disposed below the forward end of the frame, and a deployed configuration in which the calf support platform is inclined at an angle above that of the stowed configuration. The foot support platform is movably connected to the calf support platform and travels with the calf support platform as the calf support platform is moved between its stowed and deployed configurations. The foot support platform telescopically extends from the calf support platform. The foot rest is pivotally connected to the foot support platform and is pivotable between a stowed configuration essentially parallel to the foot support platform and a deployed configuration extending outward from the foot support platform.

In another embodiment, a legrest assembly for a passenger seat is provided herein including a calf support adapted to be hinged to a forward end of a seat frame and moveable between a stowed configuration generally vertically disposed below the forward end of the frame and a deployed configuration inclined above the stowed configuration, a foot support movably connected to the calf support and travelling with the calf support between the deployed and stowed configurations, the foot support telescopically extendable from the calf support, and a foot rest pivotally connected to the foot support and pivotable between a stowed configuration substantially parallel to the foot support and a deployed configuration extending outward from the foot support.

In a further embodiment, the calf support includes a pair of laterally spaced rails interconnected through at least one plate member that maintains the rails in their relative lateral spacing.

In further embodiment, the calf support further includes a fabric diaphragm attached at its opposing lateral sides to the rails.

In a further embodiment, the rails include integral tabs extending from each of the rails that hold a retaining rod received in a longitudinally extending sleeve of the fabric diaphragm.

In a further embodiment, the legrest includes a lockable gas spring cylinder connected at one end to the seat frame and at another end to the calf support, wherein the cylinder biases the calf support toward the deployed configuration.

In a further embodiment, the foot support includes a pair of laterally spaced rails interconnected through at least one plate member that maintains the rails in their relative lateral spacing, and a fabric diaphragm attached at its opposing lateral sides to the rails.

In a further embodiment, the legrest includes an armature that facilitates movement of the foot support relative to the calf support, the armature including a swing arm that hinges about a shoulder joint defined at a pivot point that pivotally connects an upper end of the swing arm to the at least one plate member of the calf support.

In a further embodiment, the swing arm includes an upper arm member and a lower arm member connected together by a rigid elbow joint coordinating movement of the upper and lower arm members in separate parallel planes.

In a further embodiment, the legrest includes a roller rotatably attached to a distal end of the lower arm member and trapped in a lateral slot defined between first and second plate members of the foot support, the roller traveling longitudinally with the foot support and laterally along the slot as the foot support extends and retracts relative to the calf support.

In a further embodiment, the legrest includes a lockable gas spring cylinder connected at one end to the at least one plate member of the calf support and at another end to the upper arm member between the shoulder joint and the rigid elbow joint, wherein the cylinder is biased in the direction toward the stowed configuration of the foot support.

In another embodiment, an aircraft passenger seat is provided herein including a seat frame having a forward end, and a deployable legrest assembly including a calf support hinged to the forward end of the seat frame and moveable between a stowed configuration generally vertically disposed below the forward end of the seat frame and a deployed configuration inclined above the stowed configuration, a foot support movably connected to the calf support and travelling with the calf support between the deployed and stowed configurations, the foot support extendable from the calf support, and a foot rest pivotally connected to the foot support and pivotable between a stowed configuration substantially parallel to the foot support and a deployed configuration extending outward from the foot support.

BRIEF DESCRIPTION OF THE DRAWINGS

The subject matter that is regarded as the invention may be best understood by reference to the following description taken in conjunction with the accompanying drawings in which.

DETAILED DESCRIPTION OF THE INVENTION

Figure 1:
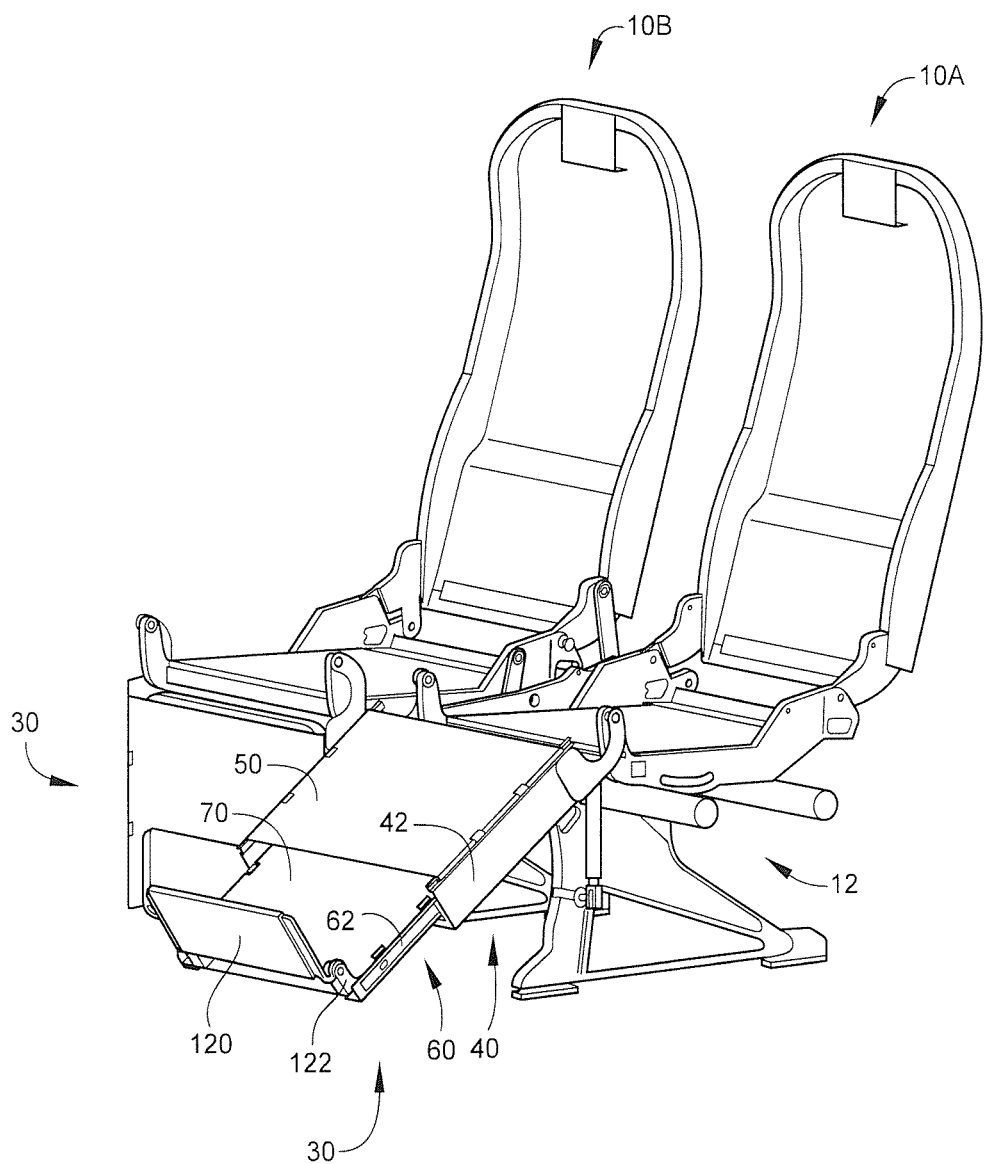
FIG. 1 is a perspective view of two adjacent passenger seats, each having a deployable legrest according to one embodiment of the present invention, with one of the two seats having its legrest deployed and the other having its legrest stowed.
Figure 2:
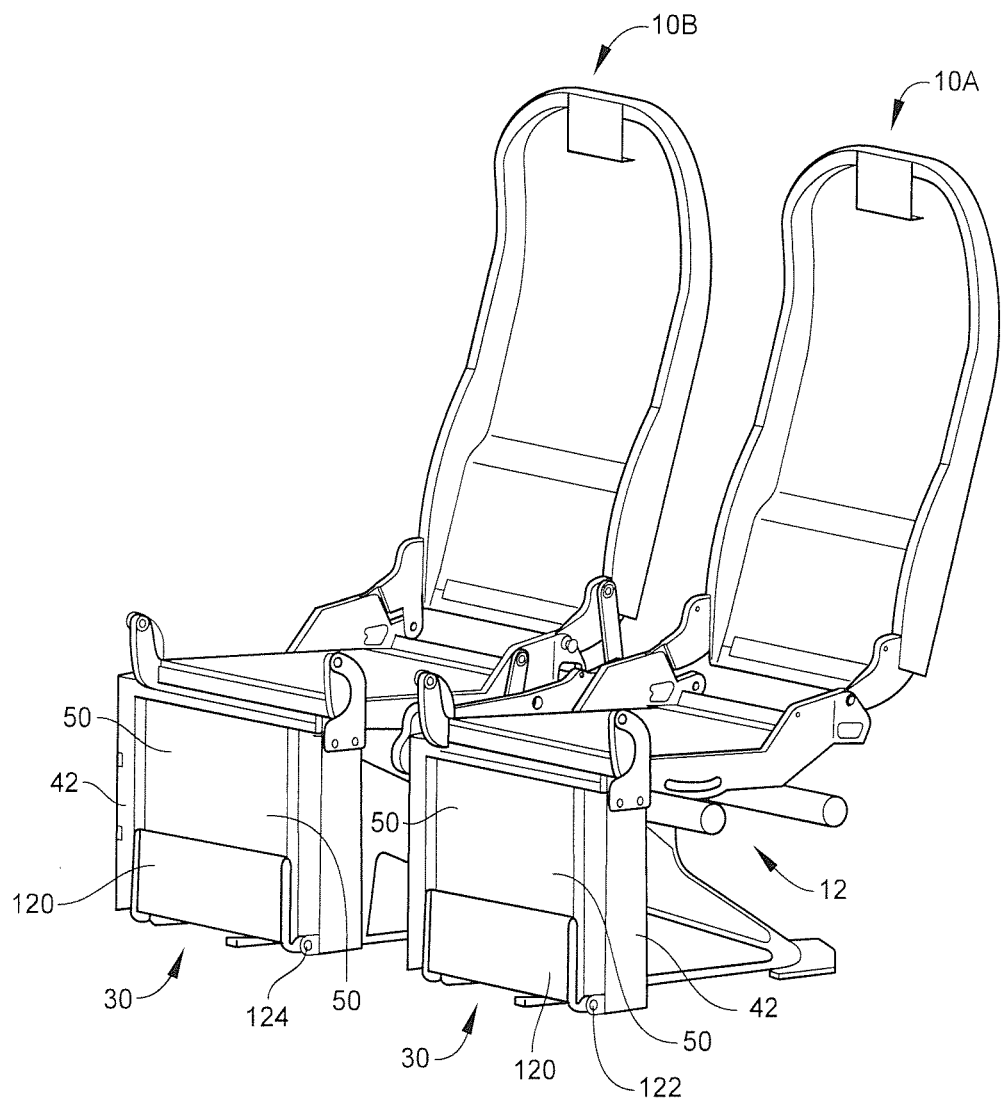
FIG. 2 is a perspective view of the passenger seats of FIG. 1 with each of the deployable legrests stowed.

Referring to the drawings wherein identical reference numerals denote the same elements throughout the various views, passenger seats 10A and 10B are illustrated in FIGS. 1 and 2, each having a deployable legrest 30 according to one embodiment of the present invention. In FIG. 1, the legrest of seat 10A is shown in its deployed configuration and the legrest of seat 10B is shown in its stowed configuration. In FIG. 1, the legrest 30 of seat 10A is deployed to support the legs and feet of a seated passenger. In FIG. 2, both legrests 30 are shown in their stowed configurations with seats 10A and 10B in their upright configurations to support seated passengers and to permit the entry and exit of passengers from the seats. As detailed in the following descriptions, the legrest 30 advantageously deploys and stows without motors or other powered actuators. In alternative embodiments, legrest motion may be powered.

Figure 4:
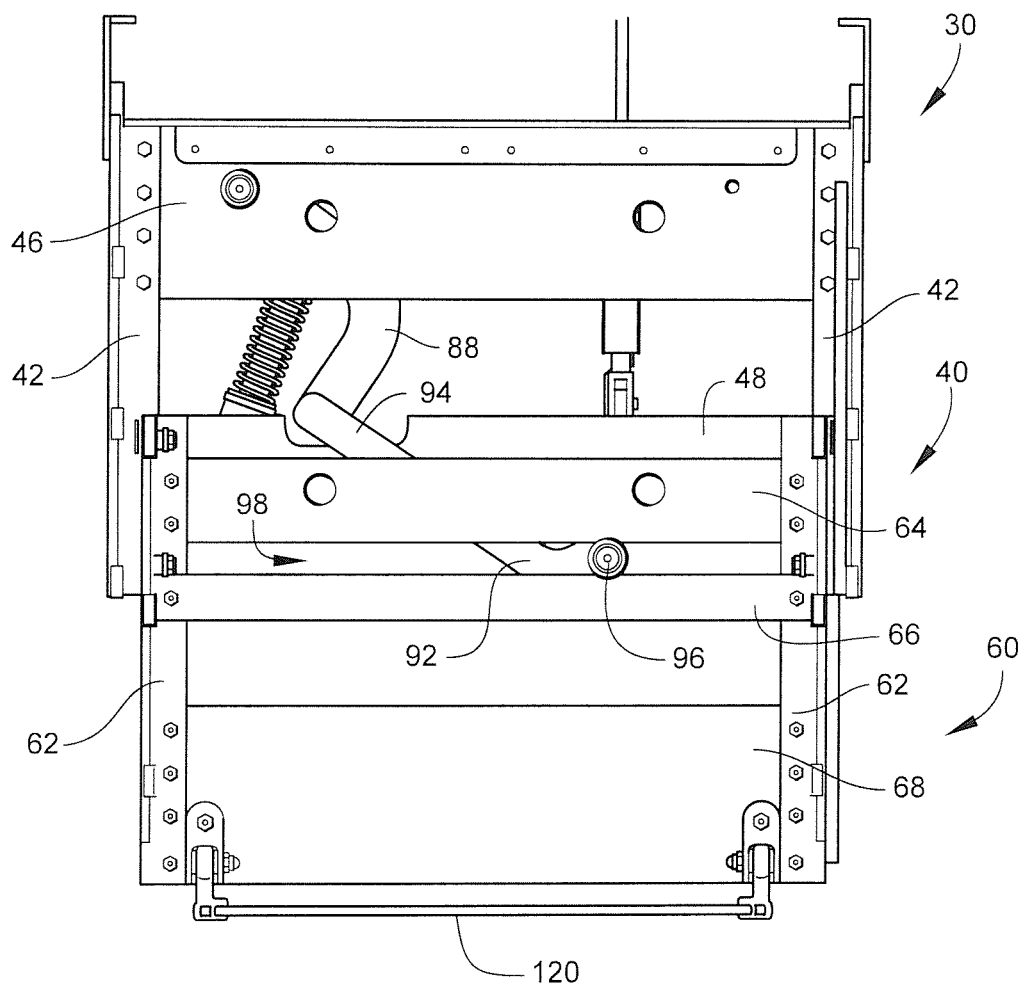
FIG. 4 is a rear view of the internal hardware of the legrest of FIG. 3 shown in the deployed configuration.
Figure 5:
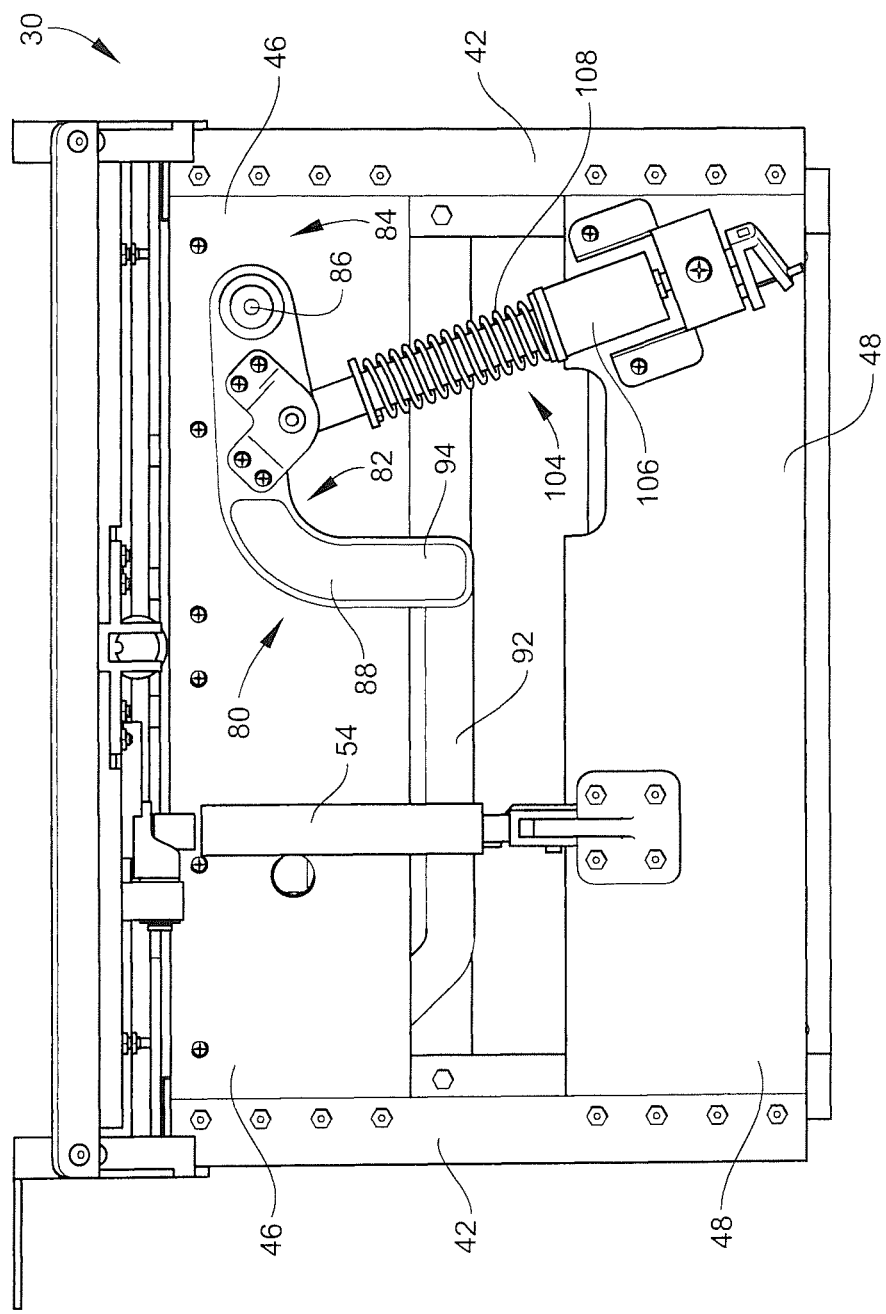
FIG. 5 is a rear view of the internal hardware of the legrest of FIG. 3 shown in the stowed configuration.

The legrest 30 includes a calf support 40 that deploys by hinging outward from the frame 12 of the seat 10A. The calf support 40 includes a pair of laterally spaced rails 42 (FIGS. 4-5) that hinge at their upper ends about a fixed axis of rotation, such as pins 44, which pivotally attach the rails to the frame 12 of the seat 10A on opposing lateral sides of the calf support 40. Upper and lower base plates 46 and 48 are connected at their opposing lateral ends to the rails 42. The base plates 46, 48 maintain the rails 42 in their relative lateral spacing and provide rigidity to the calf support 40, which hinges as a rigid assembly about the pins 44.

Figure 3:
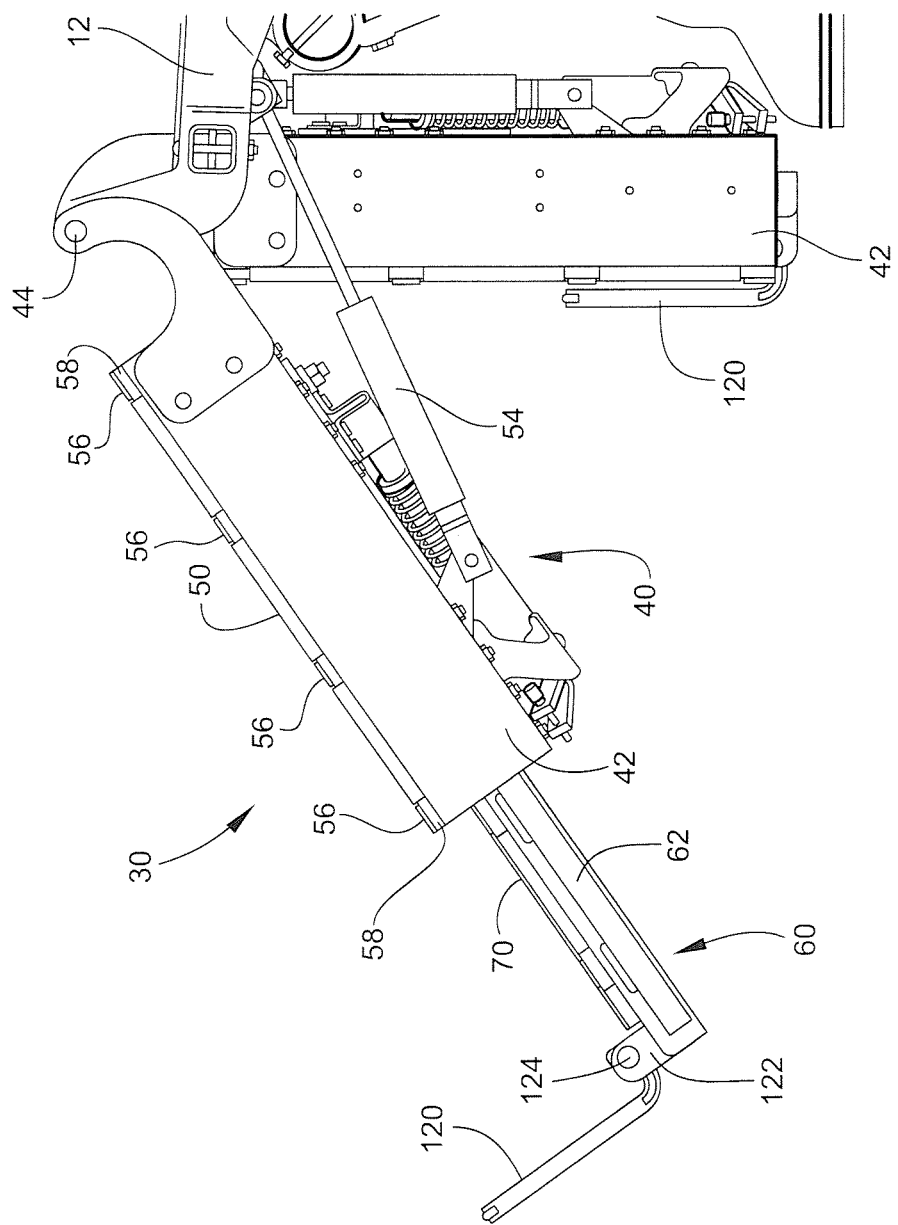
FIG. 3 is a side elevation view of a legrest according to one embodiment of the invention shown in its deployed configuration.

As shown in FIGS. 1-3, the calf support 40 includes a stretched diaphragm 50 attached at its opposing lateral sides to the rails 42. The diaphragm 50 may be constructed of a woven fabric, a flexible sheet, or other material. At each lateral side of the calf support 40, integral extensions of the rails 42 form tabs 56 that hold a retaining rod 58. Lateral side portions of the diaphragm 50 wrap around the retaining rod 58 and are sewn to the diaphragm 50 to form longitudinally extending sleeves in which the rod 58 is positioned and by which the diaphragm is attached to the rail 42. The diaphragm 50 defines a pliable comfortable support for the calves of a passenger when the calf support 40 is deployed.

A lockable gas spring cylinder 54 (FIG. 3) is connected at one end to the frame 12 of the seat 10 and at another end to the lower base plate 48 of the calf support 40. The cylinder 54 extends as the calf support 40 swings away from the seat frame 12 and is compressed as the calf support 40 is stowed. The cylinder 54 forcibly extends when released, such as by the pressing of an armrest-mounted button by the passenger or other control. In the case of an armrest-mounted control, the passenger may hold the button depressed until the preferred position of the calf support 40 is reached, and then releases the button to lock the cylinder 54 and fix the position of the calf support 40. Thus, the cylinder 54 biases the calf support 40 toward deployment away from the frame 12 and thereby forcibly assists the raising of the calf support 40 against gravity as the calf support 40 is deployed. The passenger stows the calf support 40 by applying forces to overcome the cylinder 54 while holding down the armrest-mounted button. The cylinder 54 is compressed by forces applied by the legs of the passenger as the calf support 40 is stowed. By storing energy from the work done by the passenger in stowing the calf support 40, the cylinder 54 is prepared to forcibly extend to deploy the calf support 40 upon the next pressing of the armrest-mounted button or other release.

The legrest 30 further includes a foot support 60 that deploys by extending telescopically from the calf support 40. The foot support 60 in its stowed configuration resides substantially within the calf support 40 between the diaphragm 50 and the base plates 46 and 48. The foot support 60 generally travels with the calf support 40 as the calf support hinges about the pins 44 (FIG. 3). The foot support 60 includes a pair of laterally spaced rails 62 (FIGS. 1 and 3-5) that engage the calf support 40 and move longitudinally relative to the rails 42 as the foot support 60 extends from and stows within the calf support 40. Base plates 64, 66 and 68 (FIG. 4) are connected at their opposing lateral ends to the rails 62. The base plates maintain the rails 62 in their relative lateral spacing and provide rigidity to the foot support 60, which extends as a rigid assembly from the calf support 40.

As shown in FIGS. 1 and 3, the foot support 60 includes a stretched diaphragm 70 attached at its opposing lateral sides to the rails 62. The diaphragm 70 defines a pliable comfortable support for the ankles and feet of a passenger when the foot support 60 is deployed. The diaphragm 70 may be constructed of a woven fabric, flexible sheet, or other material. At each lateral side of the foot support 60, integral extensions of the rail 62 form tabs that hold a retaining rod. Lateral side portions of the diaphragm 70 wrap around the retaining rod and are sewn to the diaphragm to form longitudinally extending sleeves in which the retaining rod is positioned and by which the diaphragm 70 is attached to the rail 62.

The legrest 30 further includes a foot rest 120 that deploys by hinging outward from the foot support 60. The foot rest 120 is pivotally attached at its opposing sides to laterally spaced brackets 122 at a fixed axis of rotation, such as pivot pins 124 (FIG. 3). The brackets 122 permit the foot rest 120 to pivot about the pins 124 between a stowed configuration (FIG. 2) and a deployed configuration (FIGS. 1 and 3). In the stowed configuration (FIG. 2), the generally planar foot rest is disposed approximately parallel to the diaphragm 70 of the foot support 60. In the deployed configuration (FIGS. 1 and 3), the foot rest 120 is disposed approximately at a right angle relative to the diaphragm 70. The brackets 122 are connected to distal ends of the rails 62 of the foot support 60 and extend outward from the rails 62 to provide space for the calf support diaphragm 50, which is disposed between the foot rest 120 and the foot support diaphragm 70 when the foot rest 120 and foot support 60 are placed in their stowed configurations as shown in FIG. 2. At each lateral side of the foot rest 120, the bracket 122 and pivot pin 124 (FIG. 3) define a friction hinge that permits the passenger to pivot the foot rest 120 to a desired angle and then generally maintains the foot rest at that angle.

In order to begin deploying the foot support 60 after a preferred position of the calf support 40 is reached, a passenger first pivots the foot rest 120 outward from the foot support 60 and calf support 40, for example by using the heels of his or her feet. The passenger then presses a second armrest-mounted button or actuates another control to permit movement of the foot support 60 relative to the calf support 40 while pressing on the foot rest 120 with the feet to extend the foot support 60 from its stowed configuration. The button is held down until the preferred extension of the foot support 60 is reached, and then the button is released to lock the foot support 60 relative to the calf support 40. Thus, the amount of extension of the foot support 60 from the calf support 40 is selectable by the seated passenger.

An armature 80 (FIG. 5) facilitates the movements of the foot support 60 relative to the calf support 40. The armature includes a swing arm 82 that hinges about a shoulder joint 84 defined at a fixed axis or rotation, such as bolt 86, that pivotally connects an upper end of the swing arm 82 to the base plate 46 of the calf support 40. The swing arm 82 includes an upper arm member 88 and a lower arm member 92 rigidly connected together by a rigid elbow joint 94. The upper arm member is generally disposed aft of the base plate 46 while the lower arm member 92 is generally disposed forward of the base plates 46 and 48. The rigid elbow joint 94 extends between the base plates 46 and 48 and rigidly coordinates movements of the upper and lower arm members 88 and 92 in separate parallel planes. The rigid elbow joint 94, and the upper and lower arm members 88 and 92 are portions of a single-piece element described individually herein for clarity.

A roller 96 (FIG. 4) is rotatably attached to the distal end of the lower arm member 92 and is trapped in a lateral slot 98 defined between the base plates 64 and 66 of the foot support 60. As the foot support 60 is extended from the stowed configuration of FIG. 5 to the deployed configuration of FIG. 4, the roller 96 travels longitudinally with the foot support and laterally along the slot 98. Due to the rigidity of the elbow joint 94, the entire swing arm 82 pivots about the shoulder joint 84 as the foot support 60 extends and withdraws and as the roller 96 travels longitudinally with and laterally along the slot 98. Foot support rails 62 may carry rollers that facilitate movement and maintain contact between rails 62 and calf support rails 42 during deployment. The rollers may be guided within tracks to prevent rotational movement between calf support 40 and foot support 60.

A lockable gas spring cylinder 104 (FIG. 5) is connected at one end to the lower base plate 48 of the calf support and at another end to the upper arm member 88 between the shoulder joint 84 and the rigid elbow joint 94. In the illustrated embodiment, the cylinder 104 has a shaft extending from a cylinder body 106 and a spring 108. Other examples within the scope of these descriptions have other constructions. The cylinder 104 is compressed as the foot support 60 is extended from the stowed configuration of FIG. 5 to the deployed configuration of FIG. 4, and extends as the foot support 60 is returned to the stowed configuration. The cylinder 104 is biased toward its extended configuration, which corresponds to the stowed configuration of the foot support 60, and thereby forcibly assists the raising of the foot support 60 against gravity as the foot support 60 is returned to the stowed configuration of FIG. 5. The cylinder 104 is compressed by forces applied by the feet of the passenger on the foot rest 120 as the foot support 60 is deployed. By storing energy from the work done by the passenger in deploying the foot support 60, the cylinder 104 is prepared to forcibly stow the foot support 60 upon the next pressing of the second armrest-mounted button or other control.

The foregoing has described a deployable legrest for a passenger seat. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A legrest assembly, comprising:
    a calf support adapted to be hinged to a forward end of a seat frame and moveable between a stowed configuration generally vertically disposed below the forward end of the frame and a deployed configuration inclined above the stowed configuration;
    a foot support movably connected to the calf support and travelling with the calf support between the deployed and stowed configurations, the foot support telescopically extendable from the calf support;
    a foot rest pivotally connected to the foot support and pivotable between a stowed configuration substantially parallel to the foot support and a deployed configuration extending outward from the foot support;
    a swing arm attached to the calf support and driving movement of the foot support relative to the calf support, the swing arm including upper and lower arm members connected through a rigid elbow joint coordinating movement of the upper and lower arm members in separate parallel planes; and
    a roller rotatably attached to the lower arm member and trapped in a lateral slot defined between first and second plate members of the foot support, the roller traveling longitudinally with the foot support and laterally along the slot as the foot support extends and retracts relative to the calf support.

2. A legrest assembly according to claim 1, wherein the calf support comprises a pair of laterally spaced rails interconnected through the plate members that maintain the rails in their relative lateral spacing.

3. A legrest assembly according to claim 2, wherein the calf support further comprises a fabric diaphragm attached at its opposing lateral sides to the rails.

4. A legrest assembly according to claim 3, further comprising integral tabs extending from each of the rails that hold a retaining rod received in a longitudinally extending sleeve of the fabric diaphragm.

5. A legrest assembly according to claim 1, further comprising a lockable gas spring cylinder connected at one end to the seat frame and at another end to the calf support, wherein the cylinder biases the calf support toward the deployed configuration.

6. A legrest assembly according to claim 1, wherein the foot support comprises a pair of laterally spaced rails interconnected through at least one plate member that maintains the rails in their relative lateral spacing, and a fabric diaphragm attached at its opposing lateral sides to the rails.

7. A legrest assembly according to claim 1, further comprising a lockable gas spring cylinder connected at one end to the at least one plate member of the calf support and at another end to the upper arm member between the shoulder joint and the rigid elbow joint, wherein the cylinder is biased in the direction toward the stowed configuration of the foot support.

8. An aircraft passenger seat, comprising:
    a seat frame having a forward end; and
    a deployable legrest assembly, comprising:
        a calf support hinged to the forward end of the seat frame and moveable between a stowed configuration generally vertically disposed below the forward end of the seat frame and a deployed configuration inclined above the stowed configuration;
        a foot support movably connected to the calf support and travelling with the calf support between the deployed and stowed configurations, the foot support extendable from the calf support;

a foot rest pivotally connected to the foot support and pivotable between a stowed configuration substantially parallel to the foot support and a deployed configuration extending outward from the foot support;

a swing arm attached to the calf support and driving movement of the foot support relative to the calf support, the swing arm including upper and lower arm members connected through a rigid elbow joint coordinating movement of the upper and lower arm members in separate parallel planes; and a roller rotatably attached to the lower arm member and trapped in a lateral slot defined between first and second plate members of the foot support, the roller traveling longitudinally with the foot support and laterally along the slot as the foot support extends and retracts relative to the calf support.

9. An aircraft passenger seat according to claim 8, wherein each of the calf support and the foot support comprises a pair of laterally spaced rails interconnected through plate members that maintains the rails in their relative lateral spacing, and a fabric diaphragm attached at its opposing lateral sides to the rails.

10. An aircraft passenger seat according to claim 8, further comprising a lockable gas spring cylinder connected at one end to the seat frame and at another end to the calf support, wherein the cylinder biases the calf support towards the deployed configuration.

11. An aircraft passenger seat according to claim 8, further comprising a lockable gas spring cylinder connected at a first end to the calf support and at second end to the upper arm member, wherein the cylinder is biased in the direction toward the stowed configuration of the foot support.

* * * * *